O. RODHE.
GAS ANALYZING APPARATUS.
APPLICATION FILED SEPT. 8, 1919.
1,373,264.
Patented Mar. 29, 1921.
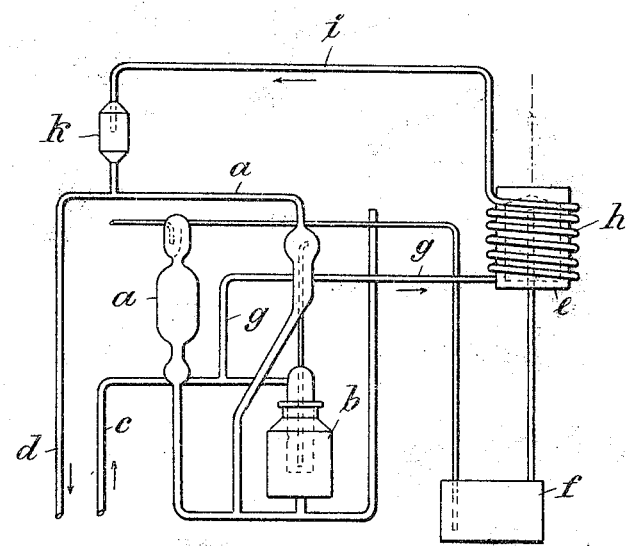

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION.

GAS-ANALYZING APPARATUS.

1,373,264. Specification of Letters Patent. Patented Mar. 29, 1921.

Application filed September 8, 1919. Serial No. 322,500.

*To all whom it may concern:*

Be it known that I, OLOF RODHE, civil engineer, subject of the King of Sweden, residing at Odengatan 54, Stockholm, Sweden, have invented certain new and useful Improvements in Gas-Analyzing Apparatus, of which the following is a specification.

My invention relates to improvements in gas analyzing apparatus, in which a gas or a mixture of gases is measured, thereafter one or more of the constituents of the gas are absorbed, whether the gas or mixture of gases is again measured.

In such gas analyzing apparatus where the gas is measured twice, that is to say before and after or simultaneously with the absorption, it is of the utmost importance that the temperature of the gas is the same at both measurements. Endeavors have been made to attain this result by letting a liquid, for instance water, flow through the gas analyzing apparatus in such a way as to first cool the one and then the other measuring vessel. However, the desired result cannot be attained in this way, the temperature of the water changing during the flow of same through or around the first-named measuring vessel, so that the two measuring vessels will be cooled to different temperatures.

The present invention has for its purpose to provide such improvements in apparatus of the said kind, that the liquid will be divided in two currents one of which enters the one, and the other of which is applied externally to the other measuring vessel. Thus the two measuring vessels will be subjected to a cooling medium of the same temperature owing to the same temperature prevailing in both currents of liquid supplied to the said vessels.

In apparatus which are driven by means of water or other liquid which is either introduced into the first measuring vessel directly or actuates another liquid, for instance mercury, which is introduced intermittently in the said measuring vessel, the cooling water for the second measuring vessel may be advantageously taken as a branch current from the main pipe containing the driving liquid.

An embodiment of the invention as set forth is diagrammatically illustrated in the accompanying drawing.

$a$ designates the first measuring vessel, $b$ a pump device used for the driving of the apparatus, which pump may be devised according to the U. S. A. Patent No. 947533, but driven by water actuating a body of mercury in the pump $b$. $c$ denotes the water supply pipe passing behind the lower part of vessel $a$ and $d$ the discharge pipe for the water. $e$ is the second measuring vessel and $f$ the absorption vessel. Obviously the measuring vessel $a$ will attain the same or approximately the same temperature as that possessed by the liquid in the pipe $c$, which latter imparts its temperature to the body of mercury contained in the pump $b$, the mercury in its turn falling and rising intermittently in the measuring vessel $a$.

In accordance with the invention a by-pipe $g$ is branched out from the supply pipe $c$ for the driving liquid to a serpentine cooler $h$ coiled around the second measuring vessel $e$. The discharge $i$ from the serpentine cooler is extended to the discharge pipe $d$.

Preferably, a regulating vessel $k$ may be inserted in the discharge pipe $i$, the said vessel comprising an adjustable drop screw or any other suitable dropping device adapted to let through about 3 or 5 drops of the cooling water per second. Evidently this regulating device may be interposed also in some other place of the cooling-liquid conduit.

What I claim as new and desire to secure by Letters Patent of the United States is:—

1. In a gas analyzing apparatus, having two measuring vessels, a conduit for conducting a cooling medium to said vessels, said conduit terminating in two laterals, one of said laterals leading into one of said vessels and the other of said laterals terminating in a serpentine coil around the other of said vessels.

2. In a gas analyzing apparatus having two measuring vessels, means comprising a coil and cooling medium for cooling one of said vessels externally and a conduit leading into the other of said vessels to cool the same with the same cooling medium.

In testimony whereof I affix my signature in presence of two witnesses.

OLOF RODHE.

Witnesses:
 GRETA PRIEN,
 ELSIE GRAHMAN.